(12) United States Patent
Leng

(10) Patent No.: US 10,729,235 B2
(45) Date of Patent: Aug. 4, 2020

(54) PLASTIC SUCTION TABLE BOARD

(71) Applicant: NEW-TEC INTEGRATION (XIAMEN) CO., LTD., Xiamen, Fujian (CN)

(72) Inventor: Luhao Leng, Fujian (CN)

(73) Assignee: NEW-TEC INTEGRATION (XIAMEN) CO., LTD., Xiamen (CN)

( * ) Notice: Subject to any disclaimer, the term of this patent is extended or adjusted under 35 U.S.C. 154(b) by 209 days.

(21) Appl. No.: 15/475,407

(22) Filed: Mar. 31, 2017

(65) Prior Publication Data

US 2018/0279771 A1    Oct. 4, 2018

(51) Int. Cl.
| | | |
|---|---|---|
| B32B 1/04 | (2006.01) | |
| A47B 13/08 | (2006.01) | |
| A47B 3/087 | (2006.01) | |
| B32B 3/04 | (2006.01) | |
| B32B 3/28 | (2006.01) | |
| B32B 3/08 | (2006.01) | |
| B32B 27/08 | (2006.01) | |

(52) U.S. Cl.
CPC .............. *A47B 13/08* (2013.01); *A47B 3/087* (2013.01); *B32B 3/04* (2013.01); *B32B 3/08* (2013.01); *B32B 3/28* (2013.01); *B32B 27/08* (2013.01); *A47B 2200/001* (2013.01); *B32B 2250/02* (2013.01); *B32B 2250/24* (2013.01); *B32B 2479/00* (2013.01)

(58) Field of Classification Search
CPC ..... A47B 13/08; A47B 13/083; A47B 13/088; A47B 2200/00; A47B 2200/001

USPC ................ 428/121, 124, 129, 130; 52/782.2, 52/782.24, 783.1, 796.11

See application file for complete search history.

(56) References Cited

U.S. PATENT DOCUMENTS

| | | | | |
|---|---|---|---|---|
| 2008/0295454 A1* | 12/2008 | Leng | .................... | B32B 3/26 53/80 |
| 2009/0324872 A1* | 12/2009 | Leng | ..................... | A47B 13/08 428/73 |

OTHER PUBLICATIONS

Genc et al., "A Systematic Approach to Integral Snap-Fit Attachment Design", 1998, Research in Engineering, vol. 10, pp. 84-93 (Year: 1998).*

* cited by examiner

*Primary Examiner* — Prashant J Khatri
*Assistant Examiner* — Zachary M Davis
(74) *Attorney, Agent, or Firm* — Cooper Legal Group, LLC

(57) ABSTRACT

A plastic suction table board has a table top and a bottom board, wherein the edge of the table top is disposed with a side edge extending downwardly, and the edge of the bottom board is disposed with a hem extending upwardly, the hem is an arc structure protruding out of the plastic suction table board, the top end of the hem is disposed with a lip extending upwardly, the side edge covers the lip, the bottom end of the side edge is disposed above the hem. The edge of the bottom board is disposed with the hem of arc structure.

7 Claims, 3 Drawing Sheets

PLASTIC SUCTION TABLE BOARD

FIELD OF THE INVENTION

The present invention relates to a plastic suction table board.

BACKGROUND OF THE INVENTION

Plastic table board is improved to a double-layer plastic thin board with light structure presently from traditional single layer solid plastic board with heavy weight, the table top is bonding to the bottom board; to make the bonding mark invisible, the edge of the table top is usually disposed with a side edge extending downwardly to cover the edge of the bottom board. Existing plastic table board may hock the clothes at the side edge of the table top and tear the clothes; the side edge may be broken due to large force. In addition, the lower edge of the side edge of the table top is sharp and it may scratch the finger.

SUMMARY OF THE INVENTION

The present invention is provided with a plastic suction table board, which overcomes the disadvantages of the traditional technology. The technical solution of the present invention is that:

A plastic suction table board, comprising a table top and a bottom board, the edge of the table top is disposed with a side edge extending downwardly, wherein the edge of the bottom board is disposed with a hem extending upwardly, the hem is an arc structure protruding out of the plastic suction table board, the top end of the hem is disposed with a lip extending upwardly, the side edge covers the lip, the bottom end of the side edge is disposed above the hem.

In another preferred embodiment, the bottom end of the side edge bends towards the lip and forming a tongue, the tongue abuts against the lip.

In another preferred embodiment, the lip is bonding to the side edge.

In another preferred embodiment, the side edge extends vertically downwardly, the lip extending vertically upwardly.

In another preferred embodiment, the top surface of the bottom board is disposed with a plurality of support bosses protruding upwardly, the support bosses support the bottom surface of the table top and bond to the table top.

In another preferred embodiment, the plastic suction table board is disposed with a metal embedded frame inside along the lip.

Compared to the traditional technology, the technical solution of the present invention has following advantages:

1. The edge of the bottom board is disposed with the hem of arc structure, the hem exposes out, such that it can avoid clothes or finger hocking the side edge of the table top, the table board has good hand feeling; in addition, the arc hem protrudes out of the plastic suction table board, making the table board solid and full.

2. The tongue abuts against the lip, making the side edge and the hem contacted tightly.

3. The lip bonds to the side edge, thus improving the connecting of both and efficiently preventing small odds from falling to the gap therebetween.

BRIEF DESCRIPTION OF THE DRAWINGS

The present invention will be further described with the drawings and the embodiments.

DETAILED DESCRIPTION OF THE EMBODIMENTS

Figure 1:
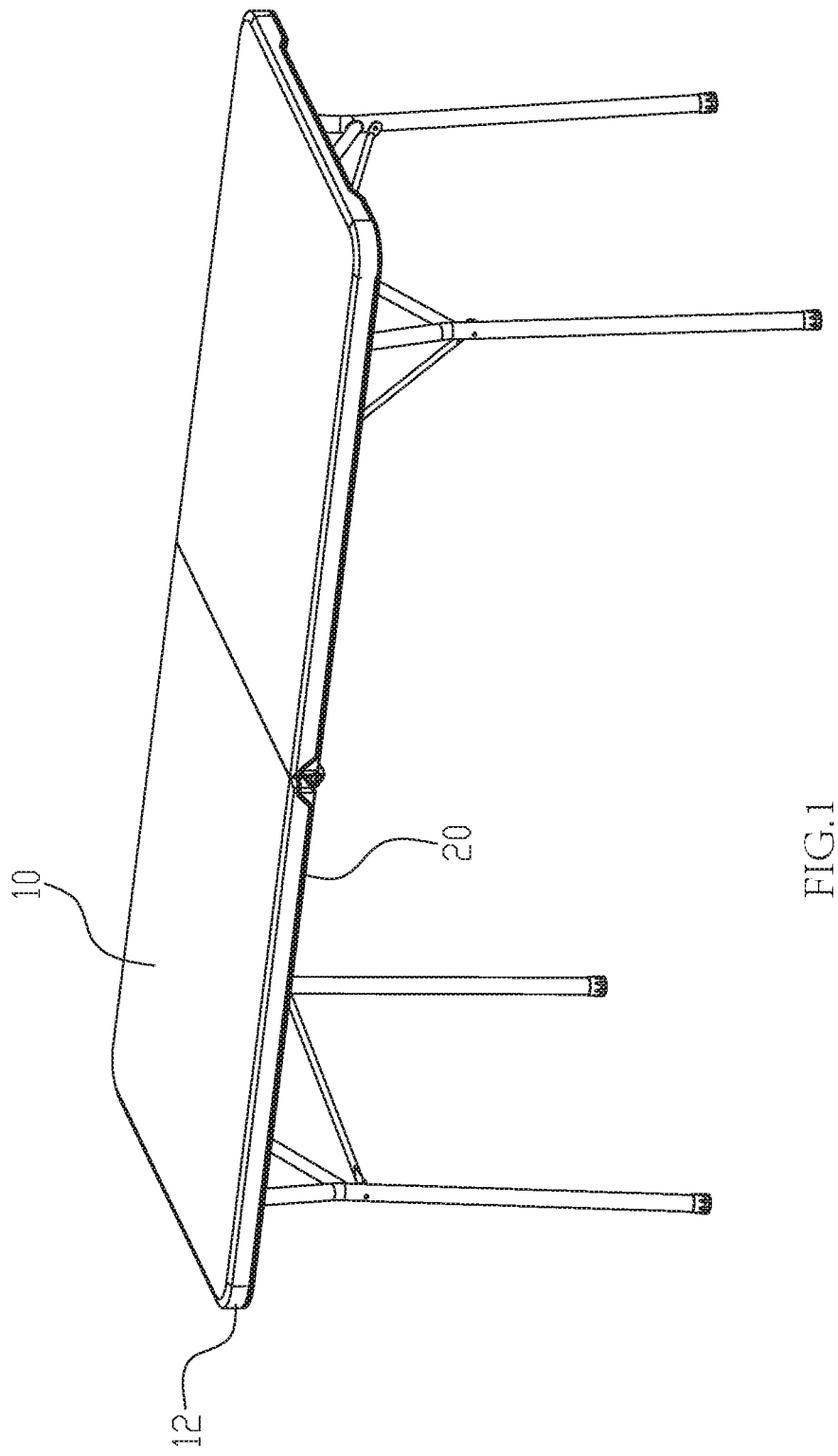
FIG. 1 illustrates a schematic diagram of a plastic suction table board of the present invention.
Figure 2:
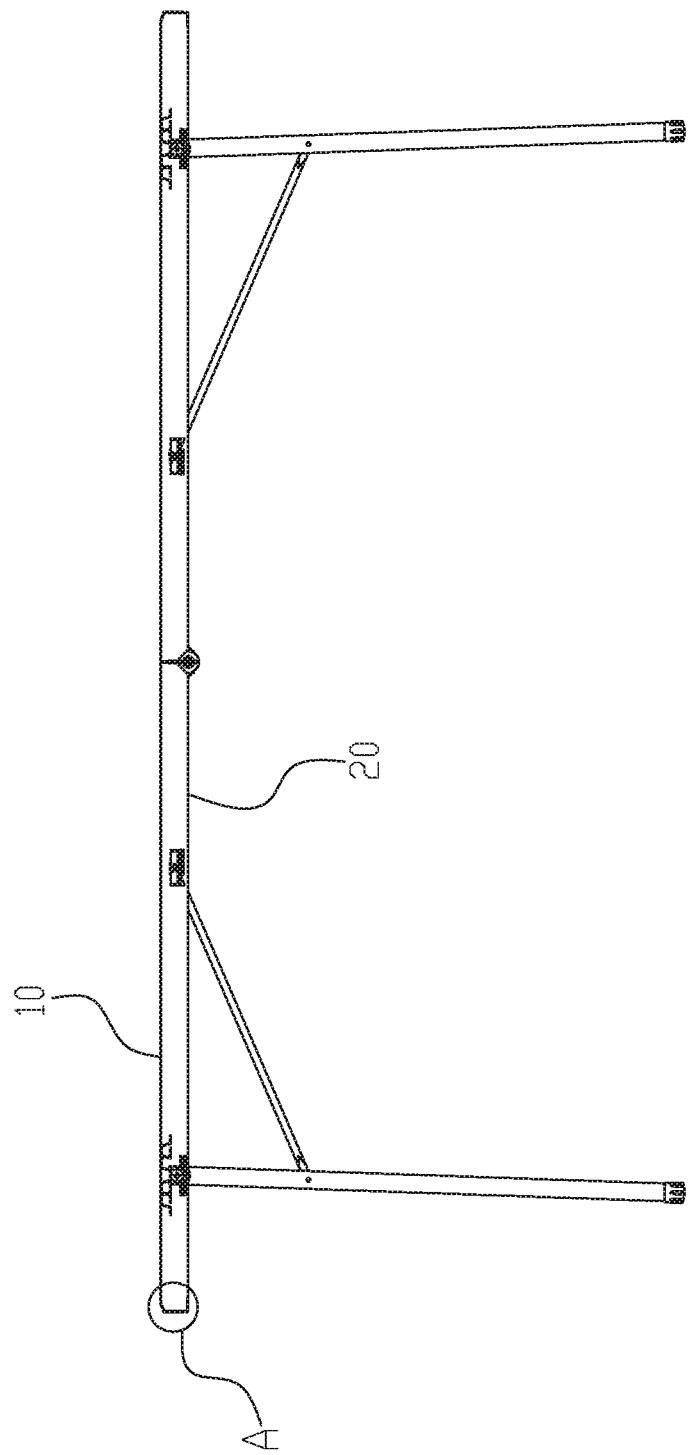
FIG. 2 illustrates a front view of the plastic suction table board of FIG. 1.
Figure 3:
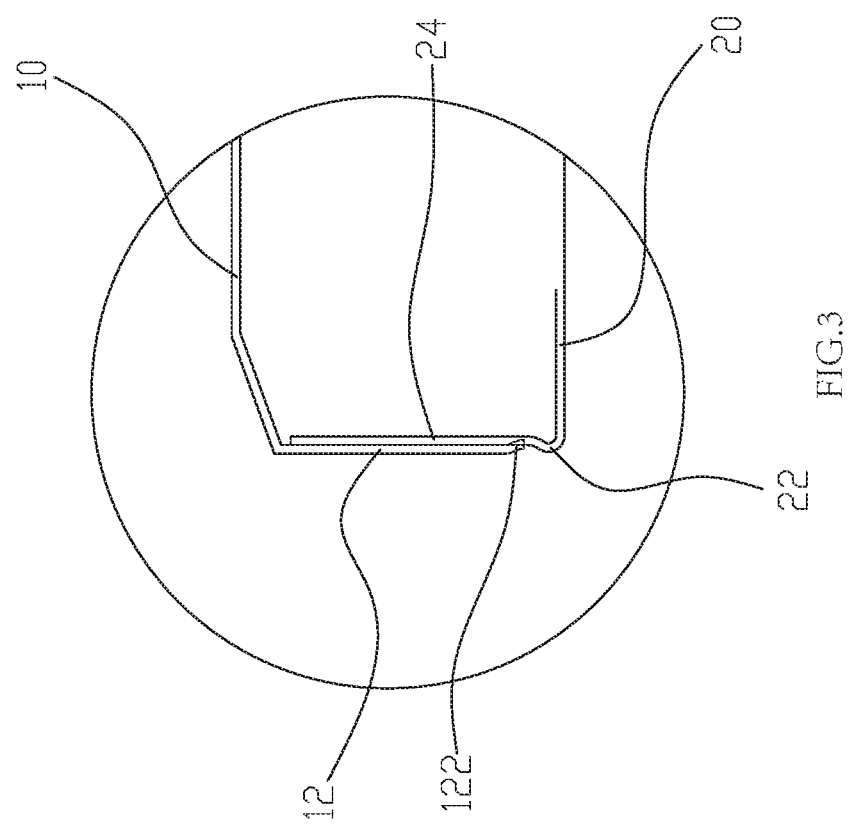
FIG. 3 illustrates an enlargement diagram of A of FIG. 2.

Referring to FIGS. 1-3, the plastic suction table board of the present invention comprises a table top 10 and a bottom board 20, the edge of the table top 10 is disposed with a side edge 12 extending downwardly, the edge of the bottom board 20 is disposed with a hem 22 extending upwardly, the hem 22 is an arc structure protruding out of the plastic suction table board, the top end of the hem 22 is disposed with a lip 24 extending upwardly, the side edge 12 covers the lip 24, the bottom end of the side edge 12 is disposed above the hem 22.

The bottom end of the side edge 12 bends towards the lip 24 and forming a tongue 122, the tongue 122 abuts against the lip 24. Preferred, the lip 24 is bonding to the side edge 12. Furthermore, the side edge 12 extends vertically downwardly, the lip 24 extending vertically upwardly.

Preferred, the top surface of the bottom board 20 is disposed with a plurality of support bosses protruding upwardly, the support bosses support the bottom surface of the table top 10 and bond to the table top.

Preferred, the plastic suction table board is disposed with a metal embedded frame inside along the lip 24.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A plastic suction table board, comprising:
 a table top and a bottom board, wherein:
  an edge of the table top is disposed with a side edge extending downwardly,
  an edge of the bottom board has a hem extending upwardly,
  the hem comprises an arc structure protruding outward,
  a top end of the hem has a lip extending upwardly,
  the side edge covers the lip,
  a bottom end of the side edge is disposed above the hem,
  a lower portion of the side edge bends towards the lip in a curve to form a tongue, and
  the tongue abuts against the lip and is spaced apart from the top end of the hem.

2. The plastic suction table board according to claim 1, wherein the lip is bonded to the side edge.

3. The plastic suction table board according to claim 2, wherein:
 the side edge extends vertically downwardly, and
 the lip extends vertically upwardly.

4. The plastic suction table board according to claim 1, wherein:
 a top surface of the bottom board has a plurality of support bosses protruding upwardly, and
 the plurality of support bosses support a bottom surface of the table top and bond to the table top.

5. The plastic suction table board according to claim 1, wherein the plastic suction table board has a metal frame inside along the lip.

6. The plastic suction table board according to claim 1, wherein:
   the side edge extends vertically downwardly, and
   the lip extends vertically upwardly.

7. The plastic suction table board according to claim 1, wherein an outermost point of the hem is co-planar with an outer wall of an upper portion of the side edge.

* * * * *